(12) United States Patent
Ashlock et al.

(10) Patent No.: US 11,665,078 B1
(45) Date of Patent: May 30, 2023

(54) DISCOVERY AND TRACING OF EXTERNAL SERVICES

(71) Applicant: Cisco Technology, Inc., San Jose, CA (US)

(72) Inventors: Hans F. Ashlock, Berkeley, CA (US); Thomas Szigeti, Vancouver (CA); David John Zacks, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/747,642

(22) Filed: May 18, 2022

(51) Int. Cl.
| | |
|---|---|
| *H04L 12/26* | (2006.01) |
| *H04L 12/24* | (2006.01) |
| *H04L 29/06* | (2006.01) |
| *H04L 43/10* | (2022.01) |
| *H04L 41/12* | (2022.01) |
| *H04L 43/04* | (2022.01) |
| *H04L 43/062* | (2022.01) |
| *G06F 16/27* | (2019.01) |
| *G06F 16/23* | (2019.01) |
| *G06Q 30/00* | (2023.01) |

(52) U.S. Cl.
CPC .............. *H04L 43/10* (2013.01); *H04L 41/12* (2013.01); *H04L 43/04* (2013.01); *H04L 43/062* (2013.01)

(58) Field of Classification Search
USPC ........................................................ 709/204
See application file for complete search history.

(56) References Cited

U.S. PATENT DOCUMENTS

| | | | |
|---|---|---|---|
| 2006/0129885 A1* | 6/2006 | Bozak ................. | G06F 11/3636 714/E11.204 |
| 2007/0192474 A1 | 8/2007 | Decasper et al. | |
| 2007/0266148 A1 | 11/2007 | Ruiz et al. | |
| 2012/0170470 A1 | 7/2012 | Duchenay et al. | |
| 2014/0297846 A1 | 10/2014 | Hoja et al. | |
| 2016/0352608 A1 | 12/2016 | Cornell et al. | |
| 2017/0005887 A1 | 1/2017 | Lad et al. | |
| 2017/0076479 A1* | 3/2017 | Benavides .............. | B61L 25/02 |
| 2017/0161167 A1 | 6/2017 | Obermiller et al. | |

(Continued)

FOREIGN PATENT DOCUMENTS

WO 2020229635 A1 11/2020

OTHER PUBLICATIONS

OpenTelemetry, "Data Sources", Last modified Nov. 12, 2021, retrieved from Internet Apr. 4, 2022, 4 pages; https://opentelemetry.io/docs/concepts/data-sources/#traces.

(Continued)

*Primary Examiner* — Jude Jean Gilles
(74) *Attorney, Agent, or Firm* — Edell, Shapiro & Finnan, LLC (57) ABSTRACT

Techniques are described for end-to-end network tracing involving external services. In one example, a synthetic agent identifies one or more external services that are involved in a process for interacting with a target application server. In response to identifying the one or more external services, the synthetic agent obtains telemetry data associated with the one or more external services. The synthetic agent correlates the telemetry data associated with the one or more external services and telemetry data associated with the target application server to generate an end-to-end network trace associated with the target application server.

20 Claims, 5 Drawing Sheets

(56) References Cited

U.S. PATENT DOCUMENTS

| | | | |
|---|---|---|---|
| 2017/0337122 | A1 | 11/2017 | Bolajwar et al. |
| 2018/0077026 | A1 | 3/2018 | Li et al. |
| 2018/0083849 | A1 | 3/2018 | Droux et al. |
| 2020/0195735 | A1 | 6/2020 | Greifeneder et al. |
| 2020/0328952 | A1* | 10/2020 | Makwarth ........... H04L 41/5051 |
| 2020/0379875 | A1* | 12/2020 | Krishnaswamy ... G06F 11/3688 |
| 2021/0019209 | A1* | 1/2021 | Krishnaswamy ... G06F 11/0772 |
| 2022/0050902 | A1 | 2/2022 | Hulick, Jr. |
| 2022/0121556 | A1 | 4/2022 | Guim Bernat et al. |
| 2022/0174012 | A1 | 6/2022 | Deshmukh et al. |
| 2022/0222359 | A1 | 7/2022 | Doshi et al. |

OTHER PUBLICATIONS

MDN Web Docs, "X-Forwarded-For", Last modified: Apr. 18, 2022, retrieved from Internet Apr. 25, 2022, 7 pages; https://developer.mozilla.org/en-US/docs/Web/HTTP/Headers/X-Forwarded-For.

MDN Web Docs, "X-Forwarded-Proto", Last modified: Apr. 18, 2022, retrieved from Internet Apr. 25, 2022, 4 pages; https://developer.mozilla.org/en-US/docs/Web/HTTP/Headers/X-Forwarded-Proto.

Wikipedia, "List of HTTP header fields", last edited Apr. 2, 2022, retrieved from Internet Apr. 4, 2022, 11 pages; https://en.wikipedia.org/wiki/List_of_HTTP_header_fields.

Kayce Basques et al., "Network features reference", Chrome Developers, published Apr. 13, 2015, updated Apr. 1, 2022, retrieved from Internet Apr. 4, 2022, 44 pages; https://developer.chrome.com/docs/devtools/network/reference.

Datadog, "Synthetic Monitoring—API and Browser Testing", Datadog 2022, Mar. 7, 2022, 7 pages; https://www.datadoghq.com/product/synthetic-monitoring/.

Salman Taherizadeh et al., "Monitoring self-adaptive applications within edge computing frameworks: A state-of-the-art review", Available online Nov. 2, 2017, Elsevier Inc., The Journal of Systems and Software 136 (2018), 20 pages.

Datadog, "What is Distributed Tracing? How it Works & Use Cases", Datadog 2022, Mar. 9, 2022, 8 pages; https://www.datadoghq.com/knowledge-center/distributed-tracing/.

OpenTelemetry Docs, "Tracing," Mar. 9, 2022, Lightstep, Inc.; https://opentelemetry.lightstep.com.

OpenTelemetry, "Resource Semantic Conventions", 7 pages; retrieved from Internet Apr. 4, 2022; https://opentelemetry.io/docs/reference/specification/resource/semantic_conventions/.

W3C, "Trace Context", Nov. 23, 2021, 17 pages; https://www.w3.org/TR/trace-context/#traceparent-header.

* cited by examiner

DISCOVERY AND TRACING OF EXTERNAL SERVICES

TECHNICAL FIELD

The present disclosure relates to computer networking.

BACKGROUND

Users may connect to an application through a browser/mobile device via the Internet. Modern web and mobile applications are becoming increasingly sophisticated and complex. These applications often include front-end (client-side) code that is reliant on a set of third-party cloud web services critical to the performance of the application. These services can be accessed at any time by one or more users in diverse geographic regions.

DESCRIPTION OF EXAMPLE EMBODIMENTS

Overview

Techniques are described herein for end-to-end network tracing involving external services. In one example embodiment, a synthetic agent identifies one or more external services that are involved in a process for interacting with a target application server. In response to identifying the one or more external services, the synthetic agent obtains telemetry data associated with the one or more external services. The synthetic agent correlates the telemetry data associated with the one or more external services and telemetry data associated with the target application server to generate an end-to-end network trace associated with the target application server.

Example Embodiments

Figure 1:
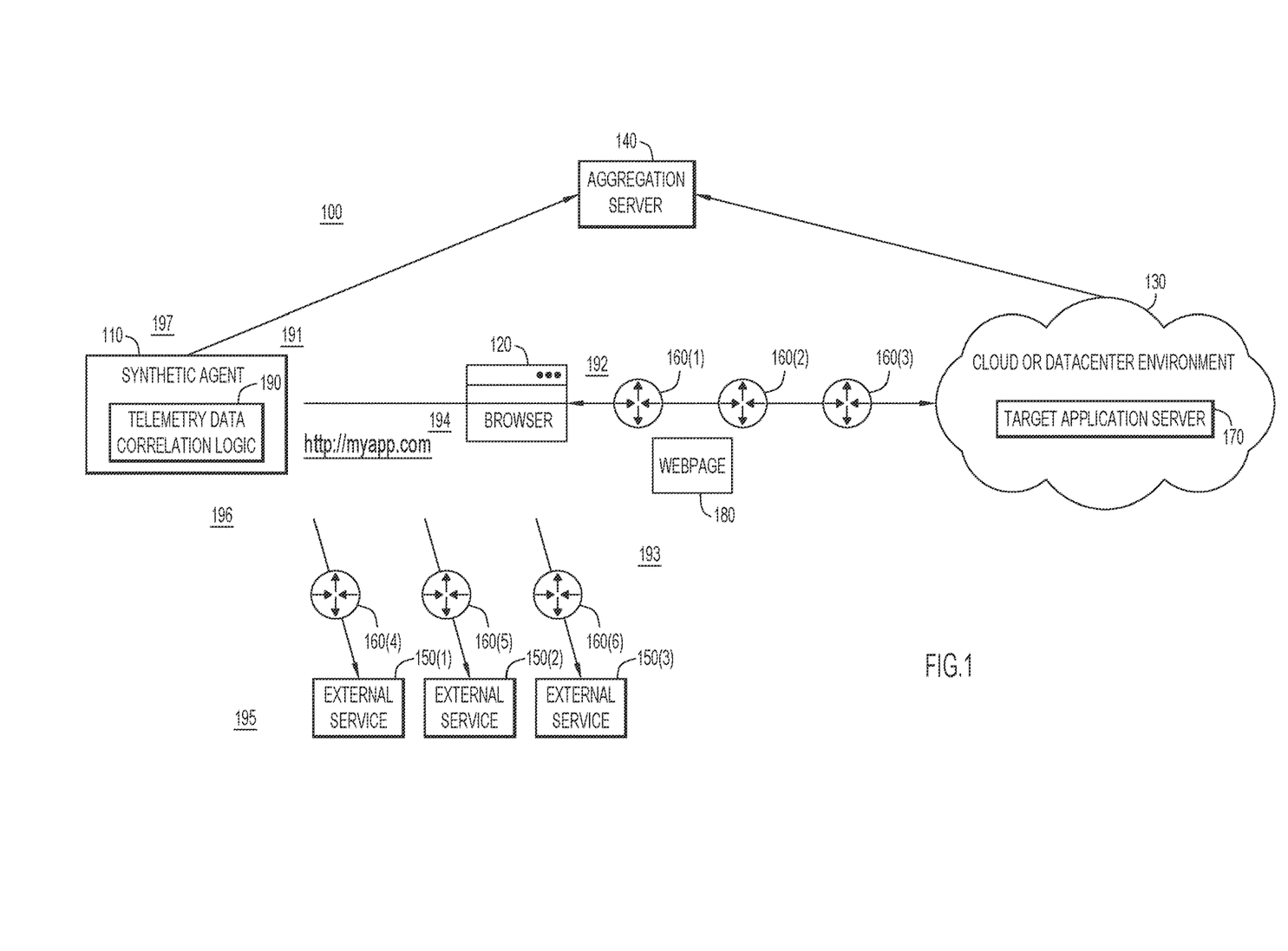
FIG. 1 illustrates a system configured for end-to-end network tracing involving external services, according to an example embodiment.

FIG. 1 illustrates a system 100 configured for end-to-end network tracing involving external services, according to an example embodiment. System 100 includes synthetic agent 110, browser 120, cloud or datacenter environment 130, aggregation server 140, external services 150(1)-150(3), and network nodes 160(1)-160(6). Cloud or datacenter environment 130 hosts target application server 170 (e.g., an application origin server).

Synthetic agent 110 may be a dedicated test device, such as an agent configured for implementation with the ThousandEyes® software monitoring platform. The Thousand-Eyes software monitoring platform may provide visibility and enable actions to maintain and optimize digital services, such as application experience, hop-by-hop network path, and performance. Browser 120 (e.g., a web/Internet browser) may be configured to access target application server 170 via the Internet and fetch, load, and process code for initial webpage 180. In one example, one or more browser instances of browser 120 may run on synthetic agent 110.

Cloud or datacenter environment 130 may be an environment configured to run a Kubernetes® system. The Kubernetes system may be an open-source system for automating deployment, scaling, and management of containerized applications. Target application server 170 may include one or more core application servers/services configured to host a web or mobile application and to serve up initial webpage 180 to browser 120.

External services 150(1)-150(3) may include any suitable services involved in a process for interacting with target application server 170. In one example, in response to browser 120 initiating a web request to target application server 170, target application server 170 may provide initial webpage 180 to browser 120. Initial webpage 180 may, in turn, prompt browser 120 to access external services 150(1)-150(3), so that browser 120 can load a full webpage. Examples of external services 150(1)-150(3) may include Domain Name System (DNS) services, Content Delivery Network (CDN) services, authentication services (e.g., Identity Provider (IdP) services), framework provider services, Secure Access Service Edge (SASE) services, adware services, etc. External services 150(1)-150(3) may be front-end services that are accessible by browser 120.

Network nodes 160(1)-160(6) may include routers, switches, etc. Network nodes 160(1)-160(3) are configured to transmit network communications between browser 120 and cloud or datacenter environment 130. Network nodes 160(4)-160(6) are configured to transmit network communications between synthetic agent 110 or browser 120 and external services 150(1)-150(3), respectively.

External services 150(1)-150(3) may impact the performance of the application from an end-user perspective. For example, issues associated with accessing external services 150(1)-150(3) (e.g., delays, inaccessibility, etc.) can lead to issues associated with accessing services offered by target application server 170. One or more of external services 150(1)-150(3) may be critical to the application, e.g., the application is inaccessible if one or more of external services 150(1)-150(3) are also inaccessible.

Therefore, any developers and application owners who wish to understand the performance of the application should also understand the performance of external services 150(1)-150(3) on which the application depends. However, external services 150(1)-150(3) cannot be reliably identified from the application topology, and the location and performance of external services 150(1)-150(3) cannot be evaluated until the application is loaded in browser 120. Furthermore, the set of external services 150(1)-150(3) may depend on the specific geolocation of browser 120.

As a result, existing Application Performance Monitoring (APM) tools cannot consistently and automatically identify, monitor, and troubleshoot external services 150(1)-150(3). Unable to reliably generate a complete view of the front-end application architecture, existing APM tools leave a large gap in understanding the real-world performance of the application.

Accordingly, to enable more complete testing coverage of the application—which relies on external services 150(1)-150(3)—telemetry data correlation logic 190 is provided on synthetic agent 110. Telemetry data correlation logic 190 causes synthetic agent 110 to perform operations disclosed herein. In one example, synthetic agent 110 identifies one or more of external services 150(1)-150(3) and, in response, obtains telemetry data associated with the one or more external services. Synthetic agent 110 may correlate the telemetry data associated with one or more of external services 150(1)-150(3) and telemetry data associated with target application server 170 to generate an end-to-end network trace associated with target application server 170.

Thus, system 100 may measure the performance of external services 150(1)-150(3) and correlate the performance of external services 150(1)-150(3) with the performance of the application. This improved coverage may provide a more complete and accurate view of actual application performance, allowing application and cloud teams to better optimize and troubleshoot the application.

A specific example embodiment is now disclosed. At operation 191, synthetic agent 110 generates one or more network communications. The one or more network communications may include a synthetic web/application request and/or a synthetic network probe. In one example, synthetic agent 110 may simultaneously generate the synthetic web request and the synthetic network probe. The synthetic web request and/or synthetic network probe may target the application, e.g., "http://myapp.com."

Synthetic agent 110 may initiate the one or more network communications toward target application server 170. The synthetic network probe may generate network probe data, and the synthetic web request may generate web request data. The web request data may indicate the performance of the application (e.g., total load time), and the network probe data may indicate the network path from synthetic agent 110 toward target application server 170. Synthetic agent 110 may record and tag the web request data and/or network probe data with a correlation identifier. In a further example, synthetic agent 110 may include the correlation identifier in the one or more network communications to enable cloud or datacenter environment 130 to learn the correlation identifier.

At operation 192, browser 120 may load initial webpage 180 based on application/page code obtained from target application server 170. At operation 193, during page load, client side application code/browser 120 may evaluate initial webpage 180, load initial webpage 180, and query (make requests) for additional data from external services 150(1)-150(3) and/or target application server 170. For example, as browser 120 fetches initial webpage 180 from target application server 170 and processes initial webpage 180, browser 120 may make additional web requests for web objects, from external services 150(1)-150(3) and/or target application server 170, that are required to load the full webpage. Browser 120 may use the additional data to load a full webpage based on initial webpage 180. Browser 120 may be able to load the full webpage because synthetic agent 110 initiated the request to myapp.com in a browser instance of browser 120.

Browser 120 may generate and maintain a file that records one or more of external services 150(1)-150(3) during the process for interacting with target application server 170. In one example, the file may be a Hypertext Transfer Protocol (HTTP) Archive (HAR) file (e.g., a browser waterfall HAR file). The HAR file, which may be in JavaScript Object Notation (JSON) format, may record details regarding any web requests, including any additional web requests made by browser 120 to load the full webpage. The HAR file may list any external services (e.g., external services 150(1)-150 (3)) and objects involved in loading the full webpage. In one example, browser 120 may begin recording in the HAR file with the initial synthetic web request.

An example excerpt of a HAR file is provided below. In this example, external service 1 provides a CDN service, external service 2 provides an authentication service, and external service 3 provides a framework provider service.
GET http://cdn.externalservice1.com/23432/main.js
POST https://login.externalservice2.com/auth
GET https://externalservice3.com/js/framework.js At operation 194 (e.g., after the page load is complete), browser 120 may make the HAR file available to synthetic agent 110. In one example, browser 120 writes the HAR file to the disk, which may be read by synthetic agent 110. If the HAR file is local to synthetic agent 110 and the synthetic browser session (e.g., browser 120), synthetic agent 110 may not require authentication to access the HAR file. In one example, synthetic agent 110 may reside within the security domain of an end user.

At operation 195, synthetic agent 110 loads/extracts the most recent HAR file from the browser session of browser 120. The HAR file may represent the web session initiated by synthetic agent 110. At operation 196, synthetic agent 110 evaluates the HAR file, intelligently identifies one or more of external services 150(1)-150(3), and generates one or more network communications (e.g., a synthetic web/application request and/or a synthetic network probe) to the one or more of external services 150(1)-150(3).

External services 150(1)-150(3) may be candidate external services, and at least one of the candidate external services may be a target external service. "Candidate external services" may include external services to which synthetic agent 110 may potentially send the one or more network communications. A "target external service" may include an external service to which synthetic agent 110 sends the one or more network communications.

The target external service(s) may be a critical external service that is necessary to the process for interacting with the target application server 170. In other words, for example, the process will fail without the critical external service. The remaining candidate external services may be non-critical external services. Examples of critical external services may include external services configured to perform authentication, provide application framework code, or deliver security services. Examples of non-critical external services may include services configured to serve up ads.

Synthetic agent 110 may identify the candidate external services (here, external services 150(1)-150(3)). In one example, synthetic agent 110 may identify one or more Fully Qualified Domain Names (FQDNs), object types, or Uniform Resource Locators (URLs) associated with external services 150(1)-150(3). For example, synthetic agent 110 may parse the HAR file and extract the FQDNs of the remote servers corresponding to external services 150(1)-150(3), object types requested from external services 150(1)-150(3), or the requested URL path for external services 150(1)-150 (3).

Synthetic agent 110 may identify the target external service(s) (here, external service 150(1)) from among external services 150(1)-150(3). In one example, synthetic agent 110 may identify external service 150(1) as a target external service based on a catalog/library service/lookup. In one example, the catalog service may be a dynamically/continuously updated, central Software Defined Application Visibility and Control (SDAVC) service.

Synthetic agent 110 may cross-reference the extracted FQDNs (or object types, or URLs) with the catalog service.

In one example, the catalog service provides whitelist/blacklist filtering; in another example, the catalog service provides a criticality score for web domains. If the catalog service provides whitelist/blacklist filtering, synthetic agent 110 may check a whitelist or blacklist of external services to determine which of external services 150(1)-150(3) should be considered critical. If the catalog service provides a criticality score, synthetic agent 110 may filter the FQDNs extracted from the HAR file to obtain the FQDNs that meet a certain criticality threshold.

In addition to (or instead of) FQDNs, the object type or URL path may be applied to perform criticality filtering or scoring and thereby evaluate the criticality of external services 150(1)-150(3). For example, images of the object type ".jpg" may be considered non-critical, whereas files of the object type ".js" may be critical. In this example, the criticality level of a given service domain of external services 150(1)-150(3) may be set to critical if the given external service was used to request objects considered critical to the application.

Synthetic agent 110 may identify external service 150(1) from among external services 150(1)-150(3) based on user feedback. In one example, if the catalog service provides a criticality score, the criticality threshold may be set by a user associated with the application and stored as a configuration on synthetic agent 110. In another example, if the service catalog does not contain an entry for a given domain of external services 150(1)-150(3), object type, or URL, then the criticality may be learned. More specifically, a list of any unmatched external services may be provided to the user, who may specify service criticality information (e.g., the criticality score) for each unmatched external service. The catalog service may then be updated with the user-provided service criticality information. The catalog service may be updated out-of-band from the synthetic testing process described in connection with operations 191-197.

In one example, the catalog may be unique to the end-user and/or application; thus, there may be multiple catalogs corresponding to respective end-users. Or, in another example, the catalog may be common to multiple end-users and/or applications. The common catalog may learn criticality scores from many different end-users, and/or cross-reference criticality scores with other systems configured to evaluate service criticality.

After intelligently identifying external service 150(1) as a critical service, synthetic agent 110 may save external service 150(1) to a table indexed by metadata of synthetic agent 110. The metadata may include an identifier of synthetic agent 110, a location of synthetic agent 110, a service provider of synthetic agent 110, host/provider network of synthetic agent 110, etc. In one specific example, the metadata may include geo-location information (e.g., <country>-<province/state>-<city/metro>).

After generating the list of external services/domains (e.g., external service 150(1)), synthetic agent 110 may automatically initiate one or more network communications (e.g., a synthetic web/application request and/or a synthetic network probe) to the critical external service(s) (here, external service 150(1)). The synthetic web/application request and/or synthetic network probe sent to external service 150(1) may be similar to the synthetic web/application request and/or synthetic network probe sent to target application server 170 at operation 191. For example, the one or more network communications (e.g., synthetic web requests) may include Application Programming Interface (API) queries similar to any API queries that the application would cause browser 120 to make. The one or more network communications sent to external service 150(1) may be lightweight and, as such, may not necessarily need authentication; however, from a Full Stack Observability (FSO) perspective, external service 150(1) may require identification/authorization before exposing telemetry data in response to the one or more network communications triggered to external service 150(1).

At operation 197, synthetic agent 110 obtains telemetry data in response to the one or more network communications triggered to external service 150(1). Synthetic agent 110 may monitor timing metrics associated with external service 150(1), such as server response time, page load time, Secure Sockets Layer (SSL) time, DNS resolution time (e.g., DNS lookup time to resolve Internet Protocol (IP) address), times for receiving a response from external service 150(1) and/or loading a resource (e.g., JavaScript file), and/or network latency, network loss, jitter, hop-by-hop visibility of the network connection/path between synthetic agent 110 and external service 150(1) (e.g., via network node 160(4)).

Synthetic agent 110 may tag the telemetry data obtained from external service 150(1) (e.g., the timing metrics) with the same correlation identifier that synthetic agent 110 used to tag the telemetry data associated with target application server 170 (e.g., the web request data and/or network probe data) at operation 191. Thus, synthetic agent 110 may correlate the telemetry data associated with external service 150(1) and telemetry data associated with target application server 170 to generate an end-to-end network trace associated with target application server 170. Synthetic agent 110 may associate, with the end-to-end network trace, the metadata (e.g., location) of synthetic agent 110.

Synthetic agent 110 may provide, to aggregation server 140, the telemetry data associated with external service 150(1), the telemetry data associated with target application server 170 (e.g., the web request data and/or network probe data), and the correlation identifier. Synthetic agent 110 may also provide metadata (e.g., a location) of synthetic agent 110 to aggregation server 140 with the same correlation identifier.

In a further example, cloud or datacenter environment 130 may tag, with the correlation identifier, target application telemetry data generated in response to the one or more network communications sent toward target application server 170. The target application telemetry data may include one or more spans representing one or more operations internal to target application server 170. Aggregation server 140 may obtain the target application telemetry data, with the correlation identifier, from cloud or datacenter environment 130.

Based on the correlation identifier, aggregation server 140 may aggregate the target application telemetry data with the telemetry data associated with external service 150(1) and the telemetry data associated with target application server 170 (and/or the metadata of synthetic agent 110) to generate an end-to-end network trace associated with target application server 170. The resulting end-to-end network trace may enable regional network visibility and a granular view for monitoring target application server 170. Aggregation server 140 may display the end-to-end network trace, thereby creating a single end-to-end network path view, to enable the owner of the application to view the end-to-end network trace(s) as a common test set for target application server 170 and for a given geo-region of synthetic agent 110.

Based on the telemetry data, aggregation server 140 may automatically implement a network configuration change in cloud or datacenter environment 130. Aggregation server 140 may use the telemetry data to drive configuration changes in target application server 170 to optimize the configuration of cloud or datacenter environment 130. For example, based on the telemetry data, the application owner may decide (manually or automatically) to switch CDN providers in a particular geo-region. In addition, the configuration of the synthetic web/application requests and/or synthetic network probes sent to external service 150(1) and/or target application server 170 may be automatically changed based on the telemetry data.

In another example, operations 191-197 may be repeated over time (e.g., synthetic agent 110 may send multiple synthetic requests, etc.). Aggregation server 140 may collect corresponding telemetry data and build multiple end-to-end network traces for synthetic agent 110, each corresponding to a different time. The display of the end-to-end network trace may enable the application owner to observe how the trace topology changes over time for a given synthetic agent (e.g., synthetic agent 110). Network configuration changes in cloud or datacenter environment 130 may be recommended for a user to implement, or may be automatically implemented, based on an analysis of the telemetry data over time (e.g., over multiple repeated tests).

Figure 2:
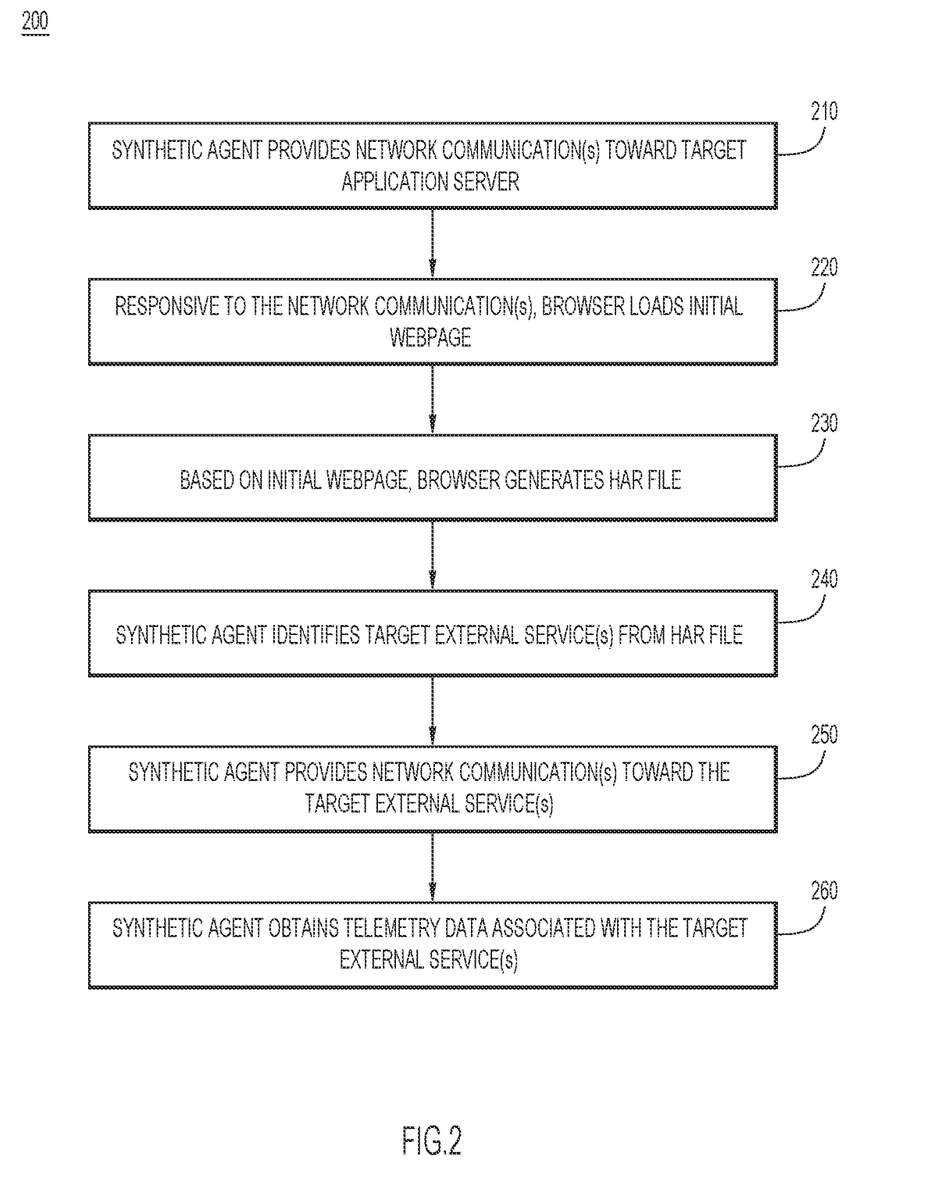
FIG. 2 illustrates a flowchart of a method for collecting telemetry data associated with one or more external services, according to an example embodiment.

FIG. 2 illustrates a flowchart of a method 200 for collecting telemetry data associated with one or more external services, according to an example embodiment. At operation 210, a synthetic agent provides one or more network communications (e.g., synthetic web requests and/or synthetic network probes) toward the target application server. At operation 220, responsive to the one or more network communications, the browser loads an initial webpage.

At operation 230, based on the initial webpage, the browser generates a HAR file. AT operation 240, the synthetic agent identifies one or more target external services from the HAR file. At operation 250, the synthetic agent provides one or more network communications (e.g., synthetic web requests and/or synthetic network probes) toward the one or more target external services. At operation 260, the synthetic agent obtains telemetry data associated with the one or more target external services.

Figure 3:
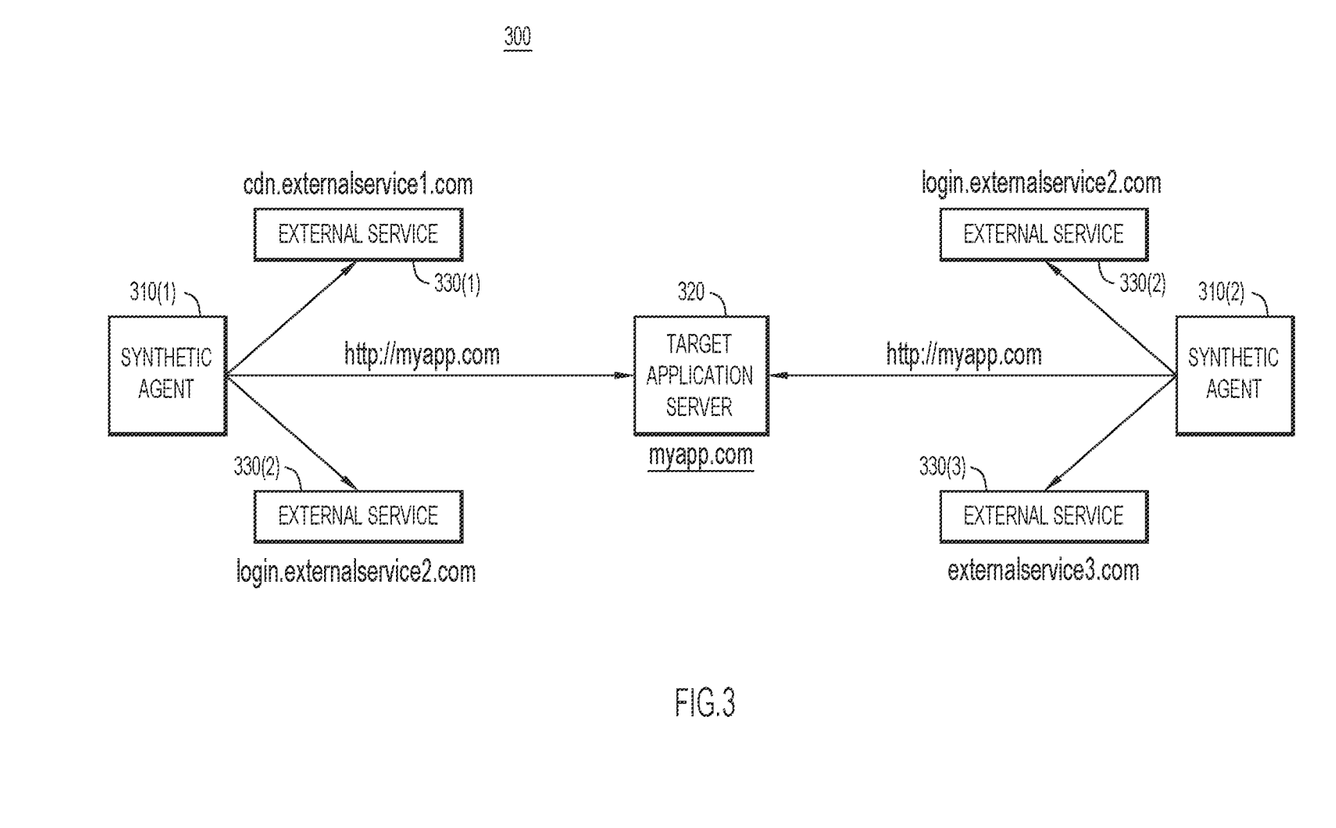
FIG. 3 illustrates a system configured for end-to-end network tracing involving external services from multiple locations, according to an example embodiment.

FIG. 3 illustrates a system 300 configured for end-to-end network tracing involving external services from multiple locations, according to an example embodiment. System 300 includes synthetic agents 310(1) and 310(2), target application server 320, and external services 330(1)-330(3). Synthetic agents 310(1) and 310(2) may be similar to synthetic agent 110, and target application server 320 may be similar to target application server 170. External services 330(1) and 330(2) are involved in a process for synthetic agent 310(1) to interact with target application server 320. External services 330(2) and 330(3) are involved in a process for synthetic agent 310(2) to with target application server 320.

Each of synthetic agents 310(1) and 310(2) may perform operations similar to operations 191-197 (FIG. 1) to correlate telemetry data associated with external services 330(1)-330(3) and telemetry data associated with target application server 320 to generate an end-to-end network trace associated with target application server 320. The process described in connection with FIG. 1 may be repeated for any number of synthetic agents (e.g., synthetic agents 310(1) and 310(2)). These processes may be initiated by multiple synthetic agents (e.g., synthetic agents 310(1) and 310(2)) sending synthetic web requests and/or synthetic network probes toward target application server 320.

In this example, external service 330(1) is a CDN service, external service 330(2) is an authentication service, and external service 330(3) is a framework provider service. Which of external services 330(1)-330(3) are accessed by synthetic agents 310(1) and 310(2) depends on the respective locations of synthetic agents 310(1) and 310(2). In this example, synthetic agent 310(1), located in Seattle, Wash., accesses external services 330(1) and 330(2), and synthetic agent 310(2), located in London, accesses external services 330(2) and 330(3). Thus, because synthetic agents 310(1) and 310(2) are in different locations, synthetic agent 310(1) accesses external service 330(1), whereas synthetic agent 310(2) accesses external service 330(3).

Synthetic agent 310(1) may generate a HAR file that includes the following information:
GET http://login.myapp.com
POST https://login.externalservice2.com/auth
GET http://cdn.externalservice1.com/23432/main.js And synthetic agent 310(2) may generate a HAR file that includes the following information:
GET http://login.myapp.com
POST https://login.externalservice2.com/auth
GET http://cdn.externalservice3.com/js/framework.js The first two lines excerpted from each HAR file are identical because both synthetic agents 310(1) and 310(2) access target application server 320 (i.e., "myapp.com") and target external service 330(2) (i.e., "externalservice2"). The last line excerpted from each HAR file is different because synthetic agent 310(1) targets external service 330(1) (i.e., "externalservice1") whereas synthetic agent 310(2) targets external service 330(3) (i.e., "externalservice3").

Thus, the network communications (e.g., synthetic web requests and/or synthetic network probes) originating in Seattle differ from those originating in London based on the external services discovered in the HAR file. More specifically, based on the HAR file, synthetic agent 310(1) may send network communications to external services 330(1) and 330(2), whereas synthetic agent 310(2) may send network communications to external services 330(2) and 330(3).

A synthetic test system (e.g., system 300) may be employed with a global set of geographically dispersed/remote/external synthetic agents (e.g., synthetic agents 310(1), 310(2), etc.) that generates synthetic tests and web application traffic from global locations to the target application server. This may be particularly useful for a broad user base connecting from diverse geo-locations. Each synthetic agent may measure the web performance of the target application server from the geo-region in which the synthetic agent is located, and may generate files (e.g., HAR files) that contain information regarding the external services required by the application for each specific geo-region request.

The synthetic agents may provide the collected telemetry data to an aggregation server. The aggregation server may, in turn, produce multiple end-to-end network traces, each associated with the location of a respective synthetic agent. Thus, for any given web application (e.g., myapp.com), a full, geo-specific monitoring set of all external critical front-end (client-side) web services that are critical to the application functionality may be created/generated. A full set of geo-specific synthetic tests may also be generated to the application and the appropriate critical external services on a per-region basis (e.g., relevant for that specific region) from the remote synthetic agents running in those specific regions. The resulting monitoring data set may be used by FSO tools to optimize and troubleshoot applications with a global user base.

In one example, the owner of the application may view multiple end-to-end network traces from global vantage points. The owner may parse the collection of end-to-end network traces based on the synthetic requests (e.g., filtering out other production/user traffic) and compare performance for different geographic regions. The display may also/alternatively enable the owner to observe how the trace topology changes over time for a given synthetic agent. The end-to-end network trace(s) may be displayed with any suitable network path data (e.g., metadata) associated with monitoring a particular application.

Figure 4:
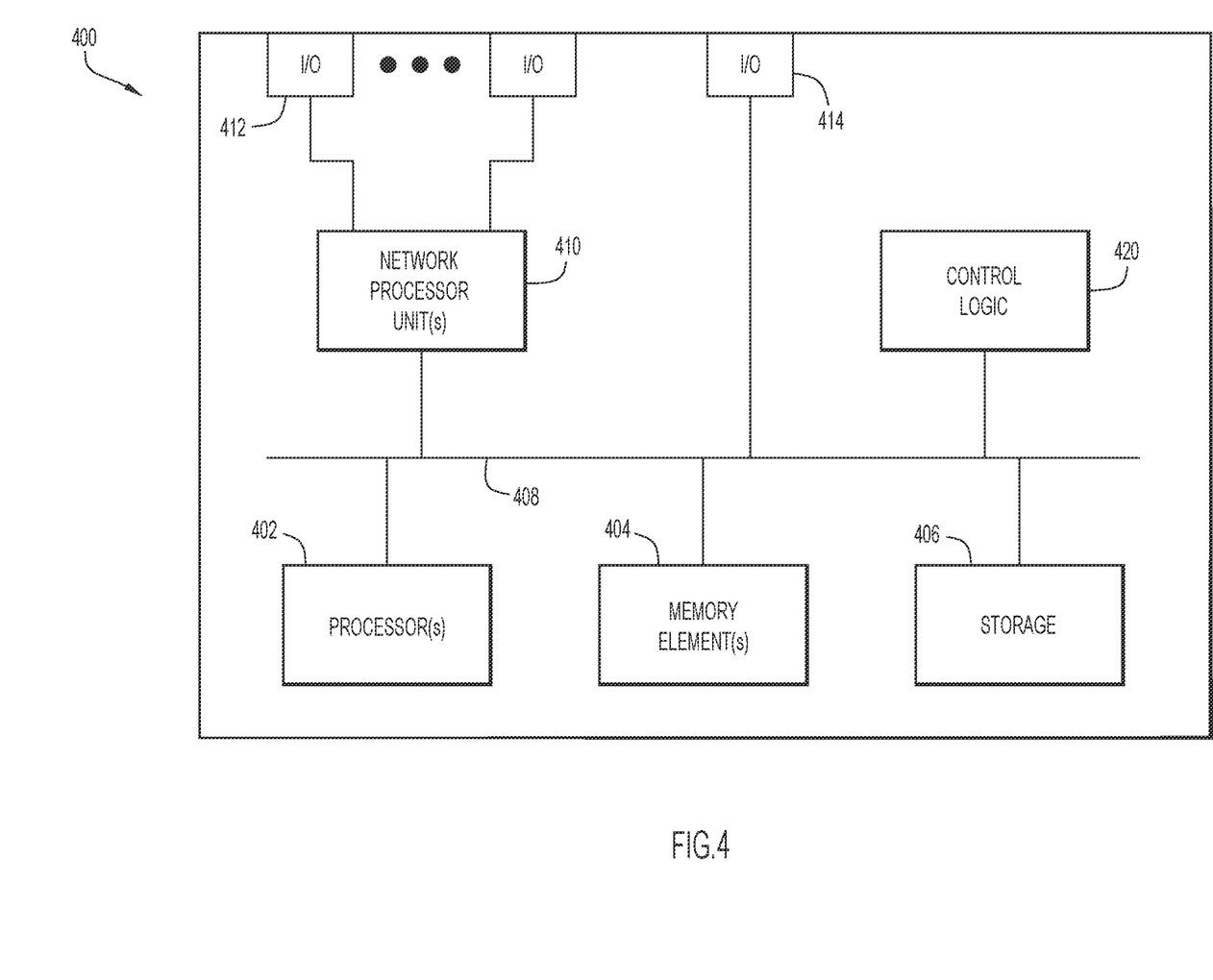
FIG. 4 illustrates a hardware block diagram of a computing device configured to perform functions associated with operations discussed herein, according to an example embodiment.

Referring to FIG. 4, FIG. 4 illustrates a hardware block diagram of a computing device 400 that may perform functions associated with operations discussed herein in connection with the techniques depicted in FIGS. 1-3. In various embodiments, a computing device, such as computing device 400 or any combination of computing devices 400, may be configured as any entity/entities as discussed for the techniques depicted in connection with FIGS. 1-3 in order to perform operations of the various techniques discussed herein.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory elements 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interfaces 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory elements 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 400 for transfer onto another computer readable storage medium.

Figure 5:
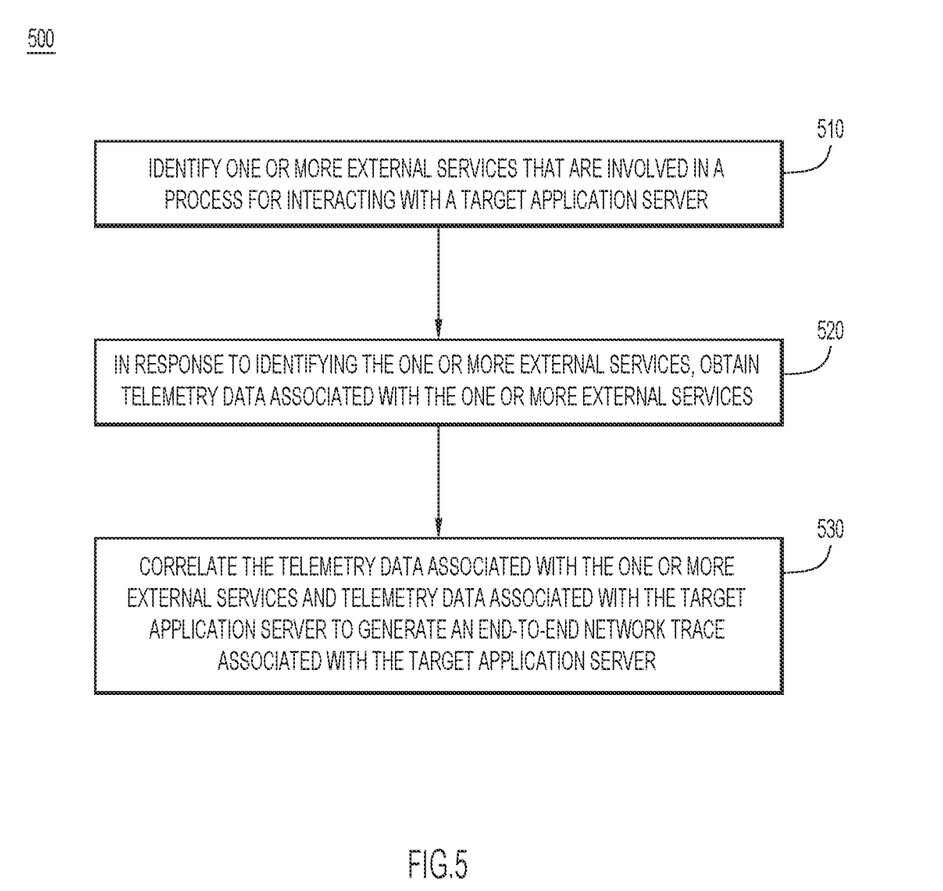
FIG. 5 illustrates a flowchart of a method for performing functions associated with operations discussed herein, according to an example embodiment.

FIG. 5 is a flowchart of an example method 500 for performing functions associated with operations discussed herein. Method 500 may be performed by any suitable entity or entities, including a synthetic agent. At operation 510, the synthetic agent identifies one or more external services that are involved in a process for interacting with a target application server. At operation 520, in response to identifying the one or more external services, the synthetic agent obtains telemetry data associated with the one or more external services. At operation 530, the synthetic agent correlates the telemetry data associated with the one or more external services and telemetry data associated with the target application server to generate an end-to-end network trace associated with the target application server.

Techniques described herein may enable service discovery from a synthetic test browser waterfall. In one example, a system may correlate synthetic test probes with true browser based waterfall/HAR data. By parsing the browser waterfall HAR file, a more complete application topology may be built and synthetic tests may be intelligently generated for monitoring coverage.

The browser waterfall HAR (HTTP archive) file may be collected and parsed to augment the coverage of synthetic testing, identify critical application services, and dynamically generate additional synthetic tests to those critical services. While the techniques described herein may involve HAR files, one or more alternatives may be used instead of or in addition to HAR files. One such alternative is an APM tool that is aware of external services; another is the application code itself.

In one example, the services may be identified based on geographic region to intelligently analyze (e.g., segment) those services to specific relevant geo-regions. Geo-specific synthetic tests may be generated to those services. The resulting data may be correlated with monitoring data associated with an application origin server to provide a unique data-set. Techniques described herein may leverage how dependent external services can vary based on geographic region.

In certain examples, an additional service criticality catalog service may be created. The catalog may offer the ability to identify/filter critical front-end dependent services (e.g., authentication services, framework CDNs, etc.) from non-critical/extraneous services (e.g., ad services). The critical external services may be correlated with the main web page load via a correlation identifier. The synthetic agent(s) may provide the resulting telemetry data to account for user geo-location to enable a more complete and accurate view of end-to-end application performance.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: identifying one or more external services that are involved in a process for interacting with a target application server; in response to identifying the one or more external services, obtaining telemetry data associated with the one or more external services; and correlating the telemetry data associated with the one or more external services and telemetry data associated with the target application server to generate an end-to-end network trace associated with the target application server.

In one example, the method further comprises: displaying the end-to-end network trace.

In one example, identifying the one or more external services includes: parsing a file that records the one or more external services during the process for interacting with the target application server.

In one example, identifying the one or more external services includes: identifying one or more critical external services that are necessary to the process for interacting with the target application server.

In one example, identifying the one or more external services includes: identifying a plurality of candidate external services; and identifying the one or more external services from among the plurality of candidate external services. In a further example, the method further comprises: identifying the one or more external services from among the plurality of candidate external services based on a catalog service. In another further example, the method further comprises: identifying the one or more external services from among the plurality of candidate external services based on user feedback.

In one example, identifying the one or more external services includes: identifying one or more fully qualified domain names, object types, or uniform resource locators associated with the one or more external services.

In one example, the method further comprises: associating, with the end-to-end network trace, metadata of a synthetic agent configured to perform the identifying of the one or more external services and the obtaining of the telemetry data associated with the one or more external services. In a further example, associating the metadata of the synthetic agent with the end-to-end network trace includes: associating a location of the synthetic agent with the end-to-end network trace In one example, obtaining the telemetry data associated with the one or more external services includes: obtaining at least one timing metric associated with the one or more external services.

In one example, the method further comprises: based on the telemetry data, automatically implementing a network configuration change in a cloud or datacenter environment that hosts the target application server.

In another form, an apparatus is provided. The apparatus comprises: a network interface configured to obtain or provide network communications; and one or more processors coupled to the network interface, wherein the one or more processors are configured to: identify one or more external services that are involved in a process for interacting with a target application server; in response to identifying the one or more external services, obtain telemetry data associated with the one or more external services; and correlate the telemetry data associated with the one or more external services and telemetry data associated with the target application server to generate an end-to-end network trace associated with the target application server.

In another form, one or more non-transitory computer readable storage media are provided. The non-transitory computer readable storage media are encoded with instructions that, when executed by a processor, cause the processor to: identify one or more external services that are involved in a process for interacting with a target application server; in response to identifying the one or more external services, obtain telemetry data associated with the one or more external services; and correlate the telemetry data associated with the one or more external services and telemetry data associated with the target application server to generate an end-to-end network trace associated with the target application server.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   identifying one or more external services that are involved in a process for interacting with a target application server;
   in response to identifying the one or more external services, obtaining telemetry data associated with the one or more external services; and
   correlating the telemetry data associated with the one or more external services and telemetry data associated with the target application server to generate an end-to-end network trace associated with the target application server.

2. The method of claim 1, further comprising:
   displaying the end-to-end network trace.

3. The method of claim 1, wherein identifying the one or more external services includes:
   parsing a file that records the one or more external services during the process for interacting with the target application server.

4. The method of claim 1, wherein identifying the one or more external services includes:
   identifying one or more critical external services that are necessary to the process for interacting with the target application server.

5. The method of claim 1, wherein identifying the one or more external services includes:
   identifying a plurality of candidate external services; and
   identifying the one or more external services from among the plurality of candidate external services.

6. The method of claim 5, further comprising:
   identifying the one or more external services from among the plurality of candidate external services based on a catalog service.

7. The method of claim 5, further comprising:
   identifying the one or more external services from among the plurality of candidate external services based on user feedback.

8. The method of claim 1, wherein identifying the one or more external services includes:
   identifying one or more fully qualified domain names, object types, or uniform resource locators associated with the one or more external services.

9. The method of claim 1, further comprising:
   associating, with the end-to-end network trace, metadata of a synthetic agent configured to perform the identifying of the one or more external services and the obtaining of the telemetry data associated with the one or more external services.

10. The method of claim 9, wherein associating the metadata of the synthetic agent with the end-to-end network trace includes:
    associating a location of the synthetic agent with the end-to-end network trace.

11. The method of claim 1, wherein obtaining the telemetry data associated with the one or more external services includes:
    obtaining at least one timing metric associated with the one or more external services.

12. The method of claim 1, further comprising:
    based on the telemetry data, automatically implementing a network configuration change in a cloud or datacenter environment that hosts the target application server.

13. An apparatus comprising:
    a network interface configured to obtain or provide network communications; and
    one or more processors coupled to the network interface, wherein the one or more processors are configured to:
    identify one or more external services that are involved in a process for interacting with a target application server;
    in response to identifying the one or more external services, obtain telemetry data associated with the one or more external services; and
    correlate the telemetry data associated with the one or more external services and telemetry data associated with the target application server to generate an end-to-end network trace associated with the target application server.

14. The apparatus of claim 13, wherein the one or more processors are configured to:
parse a file that records the one or more external services during the process for interacting with the target application server.

15. The apparatus of claim 13, wherein the one or more processors are configured to:
identify one or more critical external services that are necessary to the process for interacting with the target application server.

16. The apparatus of claim 13, wherein the one or more processors are configured to:
identify a plurality of candidate external services; and
identify the one or more external services from among the plurality of candidate external services.

17. One or more non-transitory computer readable storage media encoded with instructions that, when executed by a processor, cause the processor to:
identify one or more external services that are involved in a process for interacting with a target application server;
in response to identifying the one or more external services, obtain telemetry data associated with the one or more external services; and
correlate the telemetry data associated with the one or more external services and telemetry data associated with the target application server to generate an end-to-end network trace associated with the target application server.

18. The one or more non-transitory computer readable storage media of claim 17, wherein the instructions cause the processor to:
parse a file that records the one or more external services during the process for interacting with the target application server.

19. The one or more non-transitory computer readable storage media of claim 17, wherein the instructions cause the processor to:
identify one or more critical external services that are necessary to the process for interacting with the target application server.

20. The one or more non-transitory computer readable storage media of claim 17, wherein the instructions cause the processor to:
identify a plurality of candidate external services; and
identify the one or more external services from among the plurality of candidate external services.

* * * * *